(12) United States Patent
Bose et al.

(10) Patent No.: US 11,810,340 B2
(45) Date of Patent: Nov. 7, 2023

(54) SYSTEM AND METHOD FOR CONSENSUS-BASED REPRESENTATION AND ERROR CHECKING FOR NEURAL NETWORKS

(71) Applicant: International Business Machines Corporation, Armonk, NY (US)

(72) Inventors: Pradip Bose, Yorktown Heights, NY (US); Alper Buyuktosunoglu, White Plains, NY (US); Schuyler Eldridge, Ossining, NY (US); Karthik V. Swaminathan, Mount Kisco, NY (US); Swagath Venkataramani, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 15/825,660

(22) Filed: Nov. 29, 2017

(65) Prior Publication Data
US 2019/0164048 A1 May 30, 2019

(51) Int. Cl.
*G06V 10/82* (2022.01)
*G06N 3/08* (2023.01)
(Continued)

(52) U.S. Cl.
CPC ............ *G06V 10/82* (2022.01); *G06F 18/214* (2023.01); *G06F 18/2148* (2023.01);
(Continued)

(58) Field of Classification Search
CPC ........ G06N 20/00; G06N 3/0454; G06N 3/08; G06N 5/003; G06N 20/10; G06N 7/005;
(Continued)

(56) References Cited

U.S. PATENT DOCUMENTS 5,278,755 A * 1/1994 Takeo .................. G06N 3/0454
250/484.2
6,067,535 A 5/2000 Hobson et al.
(Continued)

FOREIGN PATENT DOCUMENTS

CN 108229534 A * 6/2018

OTHER PUBLICATIONS

Chen Zhang et al. "Optimizing FPGA-based Accelerator Design for Deep Convolutional Neural Networks", FPGA'15, Feb. 22-24, 2015 (Year: 2015).*
(Continued)

*Primary Examiner* — Ying Yu Chen
*Assistant Examiner* — Imad Kassim
(74) *Attorney, Agent, or Firm* — Amin, Turocy & Watson, LLP

(57) ABSTRACT

A system includes a determination component that determines output for successively larger neural networks of a set; and a consensus component that determines consensus between a first neural network and a second neural network of the set. A linear chain of increasingly complex neural networks trained on progressively larger inputs is utilized (e.g., increasingly complex neural networks is generally representative of increased accuracy). Outputs of progressively networks are computed until a consensus point is reached—where two or more successive large networks yield a same inference output. At such point of consensus the larger neural network of the set reaching consensus can be deemed appropriately sized (or of sufficient complexity) for a classification task at hand.

16 Claims, 12 Drawing Sheets

(51) Int. Cl.
*G06N 20/00* (2019.01)
*G06F 18/214* (2023.01)
*G06F 18/20* (2023.01)
*G06N 3/045* (2023.01)
*G06V 10/774* (2022.01)

(52) U.S. Cl.
CPC .......... *G06F 18/285* (2023.01); *G06N 3/045* (2023.01); *G06N 3/08* (2013.01); *G06N 20/00* (2019.01); *G06V 10/7747* (2022.01)

(58) Field of Classification Search
CPC ........ G06N 7/02; G06N 3/082; G06K 9/6227; G06K 9/6256; G06K 9/6257
See application file for complete search history.

(56) References Cited

U.S. PATENT DOCUMENTS

| | | | |
|---|---|---|---|
| 7,472,097 B1* | 12/2008 | Scarborough | G06N 3/045 706/26 |
| 7,613,665 B2 | 11/2009 | Chen et al. | |
| 7,698,235 B2 | 4/2010 | Kuroiwa | |
| 8,374,974 B2 | 2/2013 | Chen et al. | |
| 8,515,884 B2* | 8/2013 | Doctor | G06N 3/043 706/15 |
| 9,514,388 B2 | 12/2016 | Chen et al. | |
| 10,034,645 B1* | 7/2018 | Williams | G06T 7/0014 |
| 2001/0023419 A1* | 9/2001 | Lapointe | G16H 50/20 706/15 |
| 2009/0182696 A1 | 7/2009 | Menahem et al. | |
| 2010/0017351 A1* | 1/2010 | Hench | G06N 3/02 356/328 |
| 2014/0279753 A1 | 9/2014 | Dalessandro et al. | |
| 2015/0248609 A1 | 9/2015 | Julian et al. | |
| 2015/0340032 A1* | 11/2015 | Gruenstein | G06N 3/08 704/232 |
| 2016/0217390 A1* | 7/2016 | Shoaib | G06N 20/00 |
| 2016/0239736 A1* | 8/2016 | Sarah | G06N 3/082 |
| 2017/0278386 A1* | 9/2017 | Ko | G06F 16/5838 |
| 2018/0157976 A1* | 6/2018 | Sun | G06N 3/082 |

OTHER PUBLICATIONS

Kim, et al., "Dynamic Energy-Accuracy Trade-off Using Stochastic Computing in Deep Neural Networks," DAC '16, Jun. 5-9, 2016, Austin, TX, USA, 6 pages.

Muller, et al., "Rounding Methods for Neural Networks with Low Resolution Synaptic Weights," arXiv:1504.05767v1[cs.NE] Apr. 22, 2015, 11 pages.

Wagner, et al., "Learning Convolutional Neural Networks From Few Samples," Proceedings of International Joint Conference on Neural Networks, Dallas, Texas, USA, Aug. 4-9, 2013, 7 pages.

Xu, et al., "Efficient Subsampling for Training Complex Language Models," Retrieved Oct. 11, 2017, 9 pages.

* cited by examiner

SYSTEM AND METHOD FOR CONSENSUS-BASED REPRESENTATION AND ERROR CHECKING FOR NEURAL NETWORKS

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

TECHNICAL FIELD

The subject disclosure relates generally to exploiting spatial correlation in inputs to build neural networks for different sub-sampling rates using consensus based techniques to mitigate over-engineering of neural networks.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate the production of a final product using neural networks in a particular context are described.

Relatively small, low complexity neural networks can facilitate increased use in various broad applications that may have not been feasible with large complex neural network implementations due to prohibitive constraints (e.g., time to train, processing resources, communications bandwidth, memory constraints, etc.). Various applications can make use of relatively smaller networks trained on low resolution or 'subsampled' inputs. Accordingly, inputs can require different degrees of resolution for achieving desired inference accuracy. To account for such variation in behavior across inputs, a linear chain of increasingly complex neural networks trained on progressively larger inputs is utilized (e.g., increasingly complex neural networks is generally representative of increased accuracy). The outputs of progressively networks are computed until a consensus point is reached—where two or more successive large networks yield a same inference output. At such point of consensus the larger neural network of the set reaching consensus can be deemed appropriately sized (or of sufficient complexity) for a classification task at hand. Any further increased size or complexity is likely to result in diminishing returns (e.g., over engineered). In other words, a smaller neural network relative to a larger, over-engineered neural network, can provide increased efficiency in computation along with decrease in costs and resource consumption.

According to an embodiment, a system, comprises a memory that stores computer executable components, and a processor that executes computer executable components stored in the memory. The computer executable components comprise a determination component that determines output for successively larger neural networks of a set; and a consensus component that determines consensus between a first neural network and a second neural network of the set.

In accordance with yet another embodiment, a computer-implemented method, comprises employing a processor and memory to execute computer executable components to perform the following acts: determine output for successively larger neural networks of a set; and determine consensus between a first neural network and a second neural network of the set.

Another embodiment includes a computer program product having stored thereon the aforementioned computer executable components.

DETAILED DESCRIPTION

Figure 1:
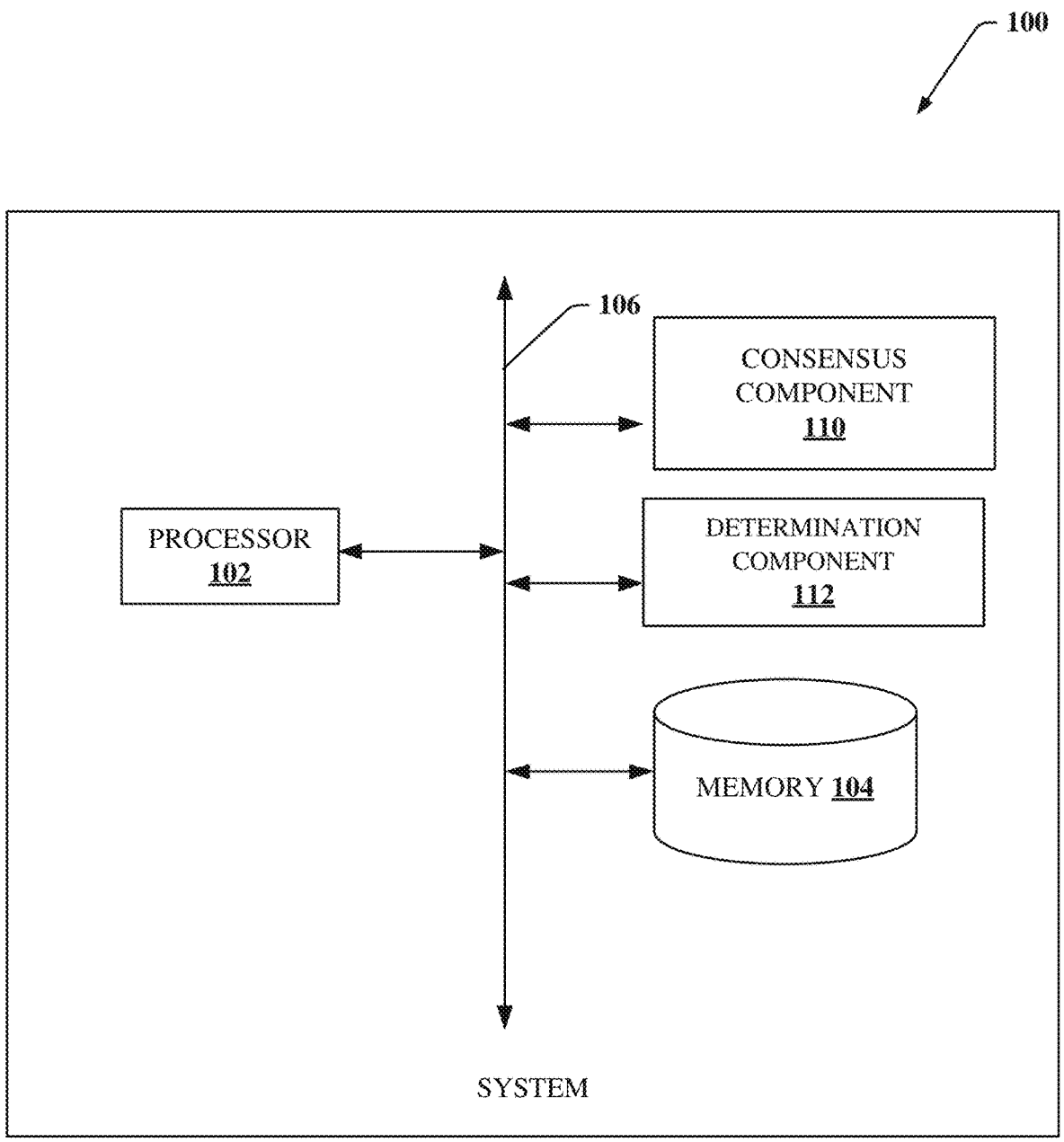
FIG. 1 illustrates a block diagram of an example system that can exploit spatial correlation in inputs to build neural networks for different sub-sampling rates using consensus based techniques.
Figure 2:
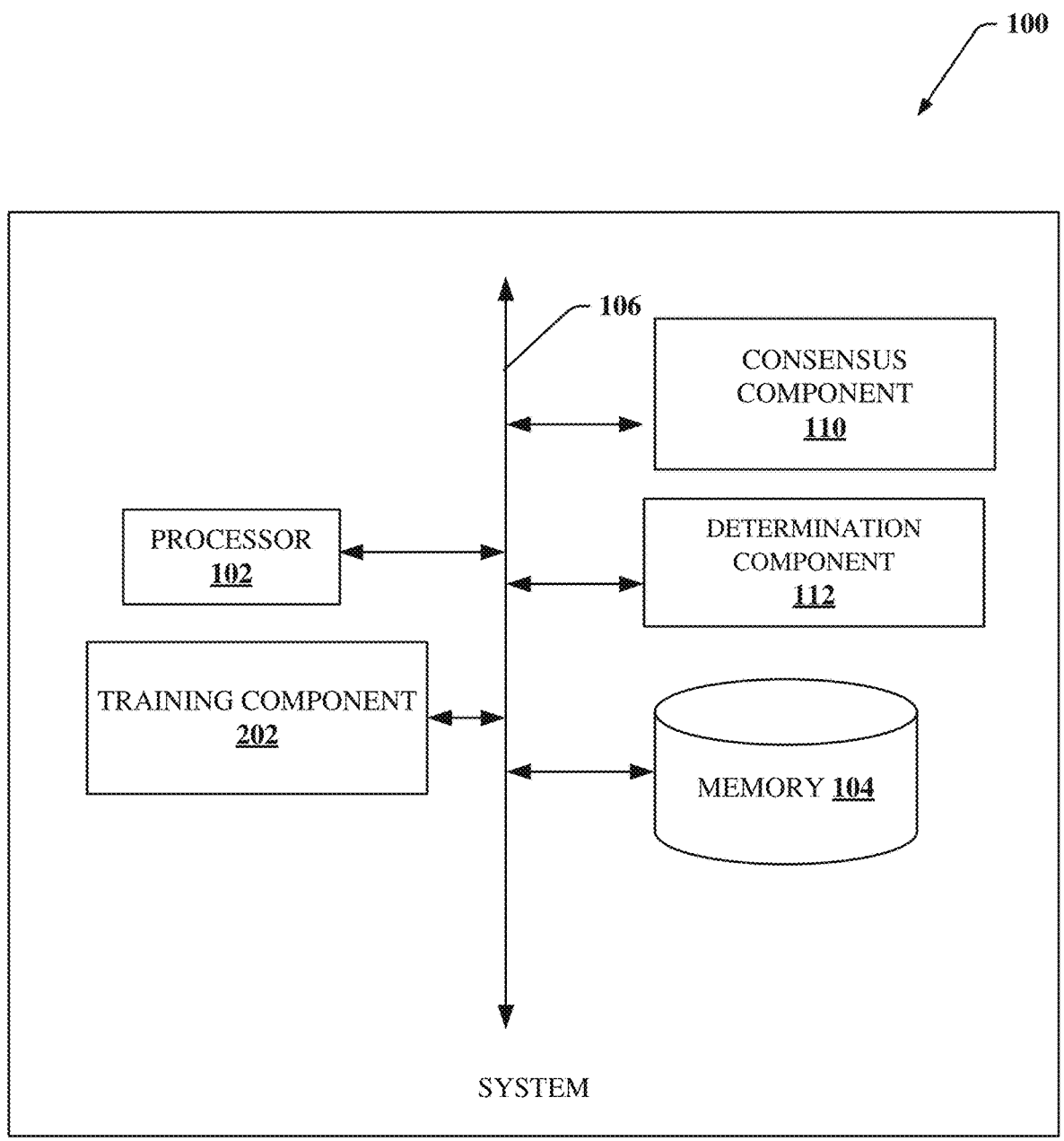
FIG. 2 illustrates a block diagram of an example system that can exploit spatial correlation in inputs to build neural networks for different sub-sampling rates using consensus based techniques.
Figure 3:
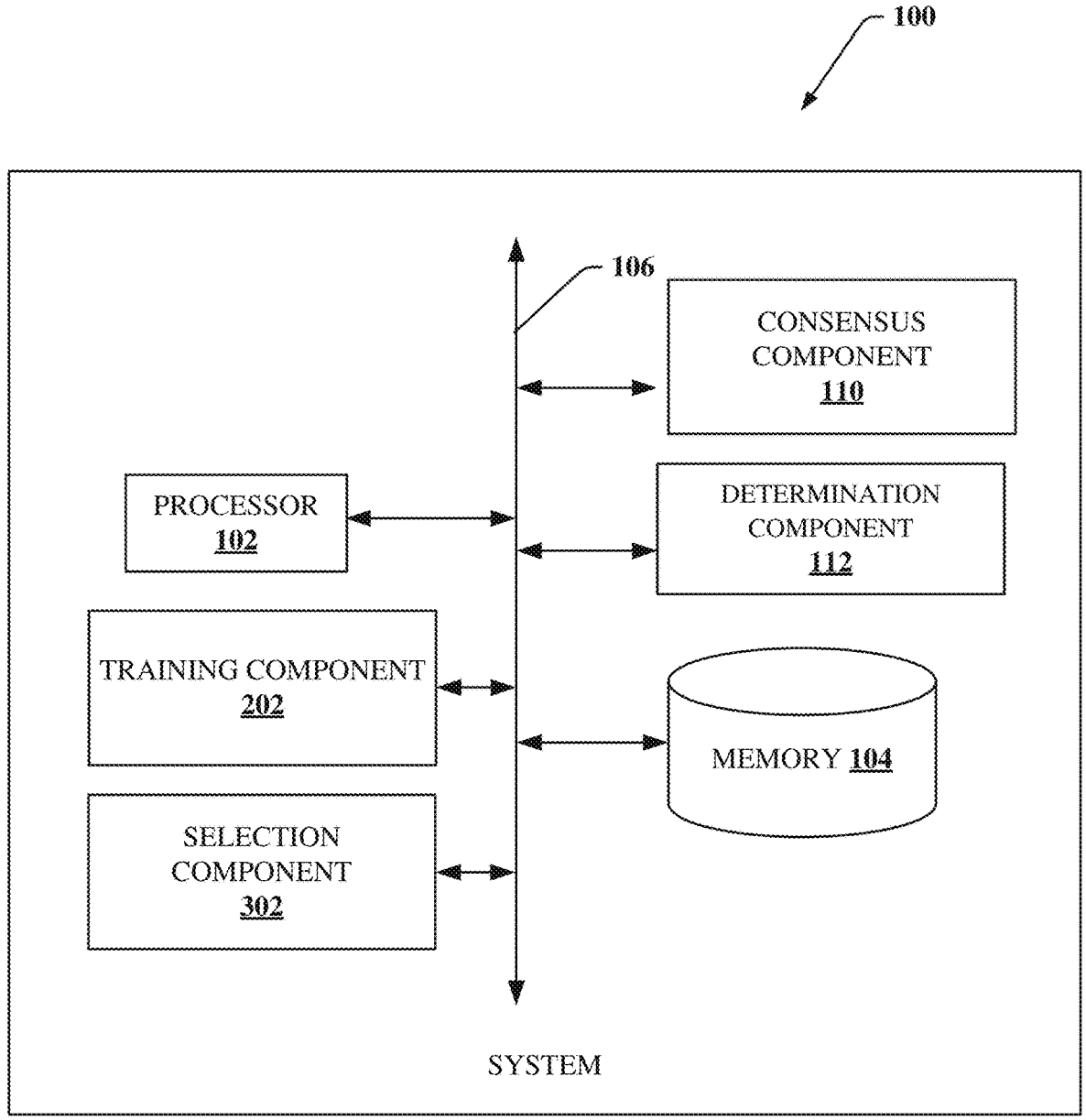
FIG. 3 illustrates a block diagram of an example system that can exploit spatial correlation in inputs to build neural networks for different sub-sampling rates using consensus based techniques.
Figure 4:
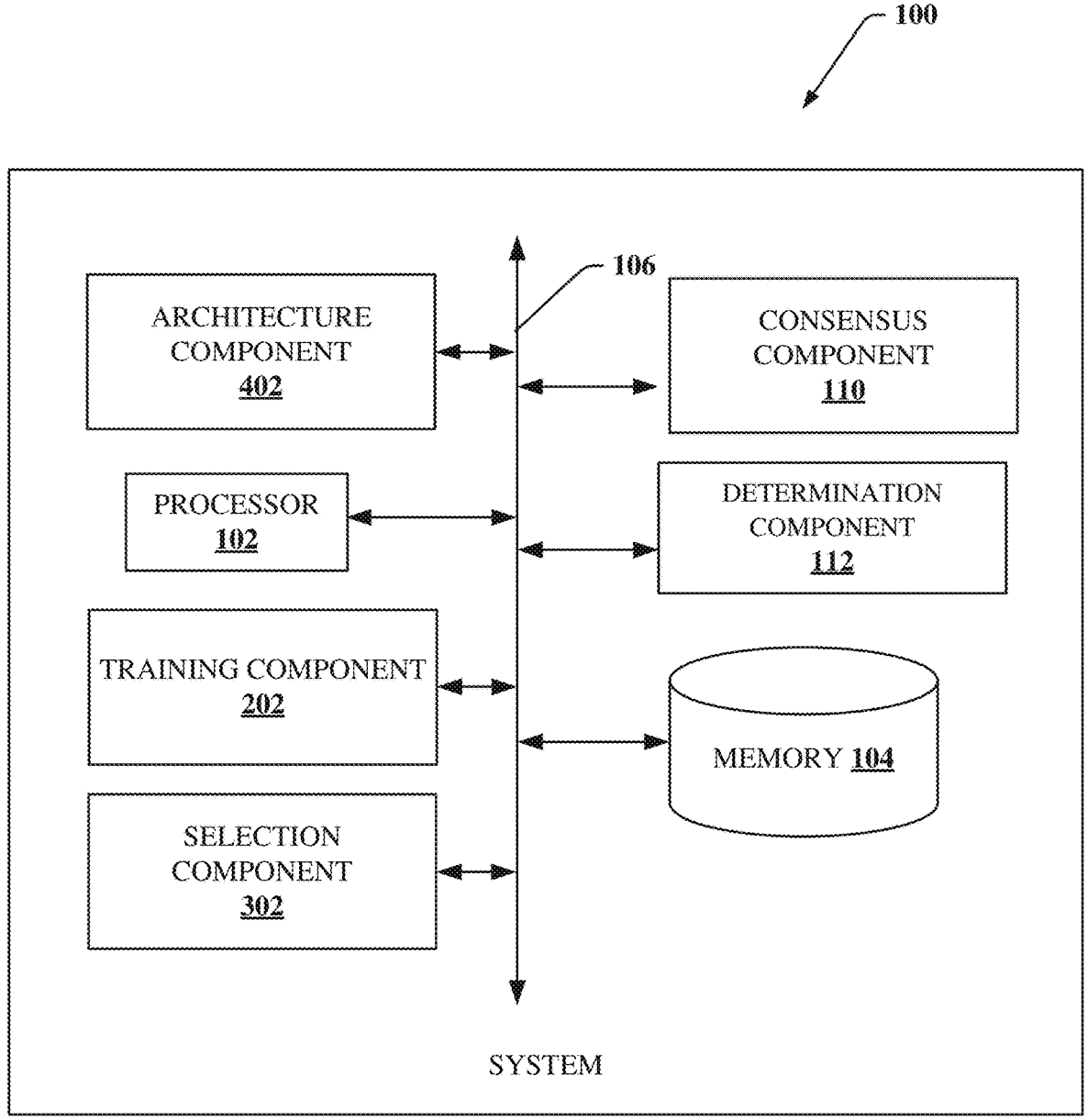
FIG. 4 illustrates a block diagram of an example system that can exploit spatial correlation in inputs to build neural networks for different sub-sampling rates using consensus based techniques.
Figure 5:
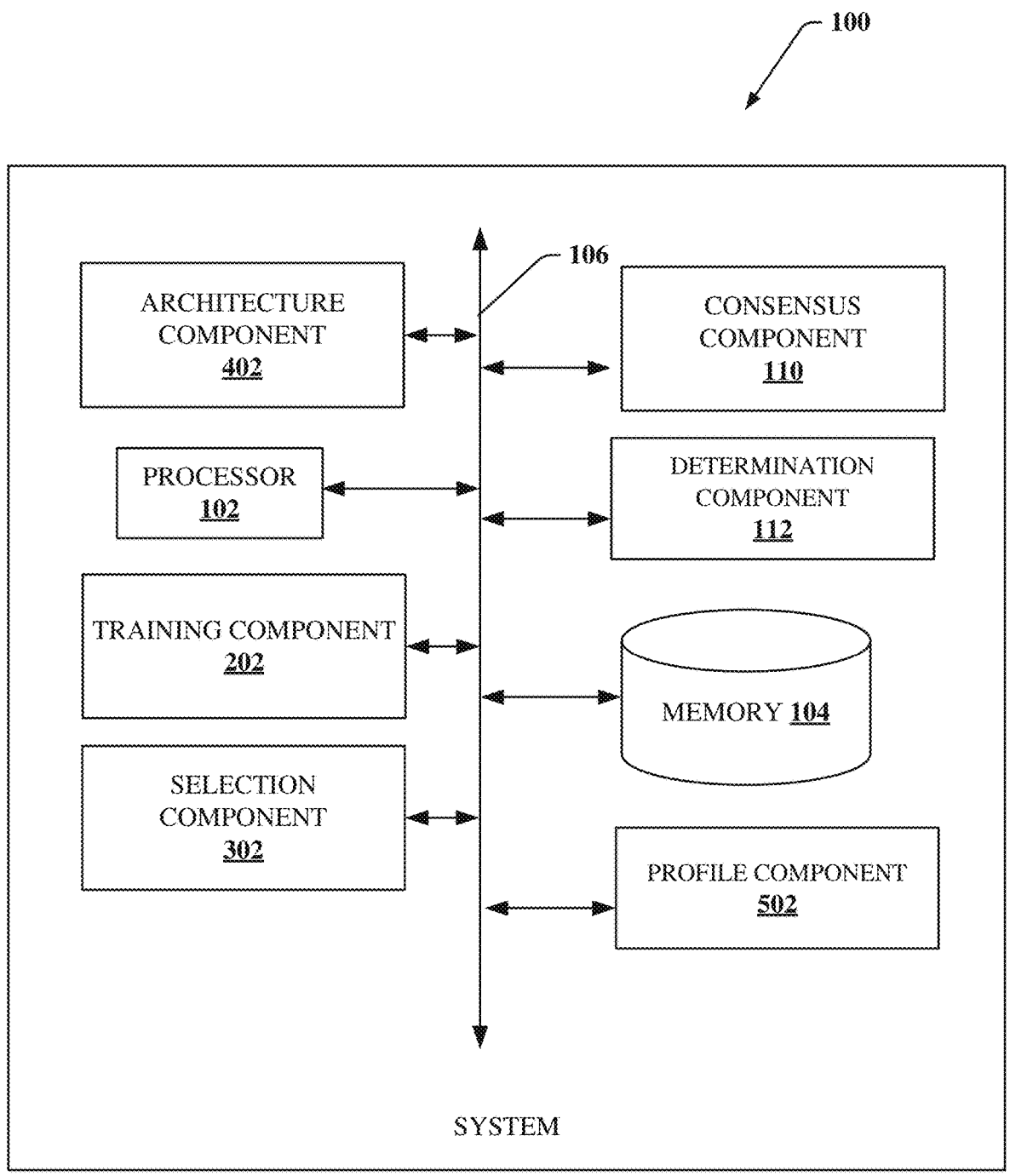
FIG. 5 illustrates a block diagram of an example system that can exploit spatial correlation in inputs to build neural networks for different sub-sampling rates using consensus based techniques.

The following detailed description is merely illustrative and is not intended to limit embodiments and/or application or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details. The concept of neural networks (for this content ANN will be used as the acronym to represent an artificial neural network) refers to computing systems inspired by biological neural networks that learn to do tasks by considering examples generally without task-specific programming. The original goal of the neural network approach was to solve problems in the same way that a human brain would. Over time, attention focused on matching specific mental abilities, leading to deviations from biology such as backpropagation (a method to calculate gradient of a loss function (produces the cost associated with a given state) with respect to weights in the ANN) or passing information in a reverse direction and adjusting the network to reflect that information. For example, in image recognition, ANNs might learn to identify images that contain facial features by analyzing example images that have been manually labeled as "facial feature" or "no facial feature" and using the analytic results to identify faces in other images. In artificial networks with multiple hidden layers, initial layers might detect primitives (e.g. pupil in an eye, an iris, eyelashes, etc.) and the output is fed forward to deeper layers that perform more abstract generalizations (e.g. eye, mouth . . . ) and so on until final layers perform complex object recognition (e.g. face) ANNs have found most use in applications difficult to express in a traditional computer algorithm using rule-based programming.

To better understand artificial neural computing, it is helpful to know first how a conventional 'serial' computer and its software process information. A serial computer has a central processor that can address an array of memory locations where data and instructions are stored. Computations are made by the processor reading an instruction as well as any data the instruction requires from memory addresses, the instruction is then executed and the results are saved in a specified memory location as required. In a serial system (and a standard parallel one as well) computational steps are deterministic, sequential and logical, and the state of a given variable can be tracked from one operation to another.

In comparison, ANNs are not sequential or necessarily deterministic. There are no complex central processors, rather there are many simple ones which generally do nothing more than take a weighted sum of their inputs from other processors. ANNs do not execute programed instructions; they respond in parallel (either simulated or actual) to a pattern of inputs presented to it.

In the current state of the art, application of neural networks at low voltages as well as identifying errors is not practical given the processing, power, memory and bandwidth consumption of traditionally large and complex neural networks. Many neural networks are operated on dense images that are reduced (e.g., compressed) and thus inherently redundant due to overlapping data particularly at high resolution. Application of neural networks in certain domains such as the Internet of Things (IOT) devices that operate at high energy efficiency require operation at low voltage and at high efficiency without sacrificing accuracy.

The subject innovation provides for systems and techniques to move from operating large and complex neural networks (that typically require considerable power, processing capabilities, memory and bandwidth) acting on dense images to relatively smaller, less complex and energy efficient neural networks operating on smaller inputs. Acting on smaller and smaller inputs results in significant gains in neural network speed and performance. To account for variation in behavior across inputs, a linear chain of increasingly complex neural networks trained on progressively larger inputs is generated (e.g., increasingly complex neural networks is generally representative of increased accuracy). The outputs of larger and larger neural networks are computed until a consensus point is achieved. The consensus point is a point at where two or more successively larger neural networks yield a same inference output. For a majority of inputs, a total sum of all computations carried out among a set of smaller neural networks would be less than that of a corresponding original large neural network thereby resulting in increased efficiency and computation. The consensus point represents an asymptote for a given classification task that facilitates identifying an appropriate sized neural network. Any neural network larger or more complex than the largest of the set of neural networks achieving consensus would be extraneous with respect to the given classification task. In other words, by analyzing outputs among progressively increasing sized neural networks and determining consensus among adjacent or non-adjacent classifiers an optimal or near optimal sized classifier can be determined.

One or more embodiments described herein provides for generation and employment of neural network model(s) that facilitate identifying and processing data to achieve an intended result of a smallest efficient network. Employing neural networks for various computational objectives can be difficult based on typical requirements needed to accomplish such tasks. Intense data interaction and CPU usage can be limiting in achieving highest quality results. High resolution images or videos are often used as inputs to neural networks for recognition and inference operations. Large neural network sizes can be due to substantial input pixel count and hidden layer sizes. In the current state of art, these images can contain tremendous amounts of data of up to and over 160 billion parameters. The length of time and computing power for processing this level of data can be prohibitive to completing a desired classification task. Accordingly, there is a need for highly efficient computing on an edge, particularly for domains such as Cognitive Internet-of-Things (IoT) and data mining within storage that can utilize exabytes up to and including yottabytes ($1000^8$ bytes).

There is an inherent data redundancy due to correlation between neighboring pixels (e.g., displayed in images or video inputs to these neural networks) that can be exploited to improve an entire process of current data calculation strategies. Hence smaller neural networks can still be capable of yielding acceptable inference outputs at much better performance and power efficiencies. Inputs can require different degrees of resolution for achieving desired inference accuracy. To account for such variation in behavior across inputs, a linear chain of increasingly complex neural networks trained on progressively larger inputs is utilized (e.g., increasingly complex neural networks is generally representative of increased accuracy). The outputs of progressively networks are computed until a consensus point is reached—where two or more successive large networks yield a same inference output. At such point of consensus the larger neural network of the set reaching consensus can be deemed appropriately sized (or of sufficient complexity) for a classification task at hand. Any further increased size or complexity is likely to result in diminishing returns (e.g., over engineered). In other words, a smaller neural network relative to a larger, over-engineered neural network, can provide increased efficiency in computation along with decrease in costs and resource consumption.

FIG. 1 illustrates a block diagram of an example, non-limiting system 100 that facilitates analyzing large sets of data and training a neural network to provide an optimum result in a particular context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

Referring to FIGS. 1-5, the system 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a training component 202, a selection component 302, an architecture component 402, and a profile component 502. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, the memory 104 can store computer executable components executable by the processor 102. The determination component 112 can determine output for successively larger neural networks of a set, and the consensus component 110 can determine consensus between a first neural network and a second neural network of the set. The training component 202 can generate a trained set of neural networks for respective inputs of varying sizes. The selection component 302 can determines output for smallest of the inputs on a simplest neural network of the set. An architecture component 402 can form a chain of classifiers by subsampling feature sizes of a large neural network based on at least one parameter comprising one or more of: successively decreasing rates or bit precision. It is to be appreciated that decreasing rates can mean increasing complexity by successively reducing interval between selected feature components (e.g., such as successive input pixels for instance). Furthermore, any suitable parameter for carrying out the subject innovation is contemplated and intended to fall within the scope of applicable claimed subject matter. A profile component 502 can determine a consensus profile that comprises a distribution of consensus points for the set of inputs. If consensus between a first and second neural network is not achieved then input size is increased. If consensus between the first and second neural network is achieved the second neural network is selected as optimally sized for a classification task at hand. In an embodiment, a consensus profile across all inputs is determined in an error-free state, and in another implementation a consensus profile across all inputs is determined in presence of errors. A determination can be made that a delta of the profile consensus without error is within a pre-determined threshold of the consensus profile in presence of errors, and an error is reported if the delta is greater than the threshold or a no-error is reported if the delta is less than the threshold.

It is to be appreciated that consensus across neural networks of varying size can be achieved by neural networks not adjacent or in direct serial order of neural networks of a set.

The various components (e.g. training component 202, a selection component 302, an architecture component 402, and a profile component 502, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, \ldots zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

As previously stated relatively smaller low complexity neural networks can facilitate an increase use in broader applications that may have not been feasible with a large neural network implementation due to earlier mentioned prohibitive constraints. One such embodiment of smaller networks consists of those trained on lower resolution or 'subsampled' inputs. It's possible that different inputs might require different degrees of resolution for achieving desired inference accuracy. To account for this variation in behavior across inputs, a linear chain of increasingly complex neural networks trained on progressively larger inputs is generated (e.g., increasingly complex neural networks is generally representative of increased accuracy). The outputs of larger and larger networks are computed until a 'consensus point' is reached—where 2 or more successive large networks yield the same inference output.

Figure 6:
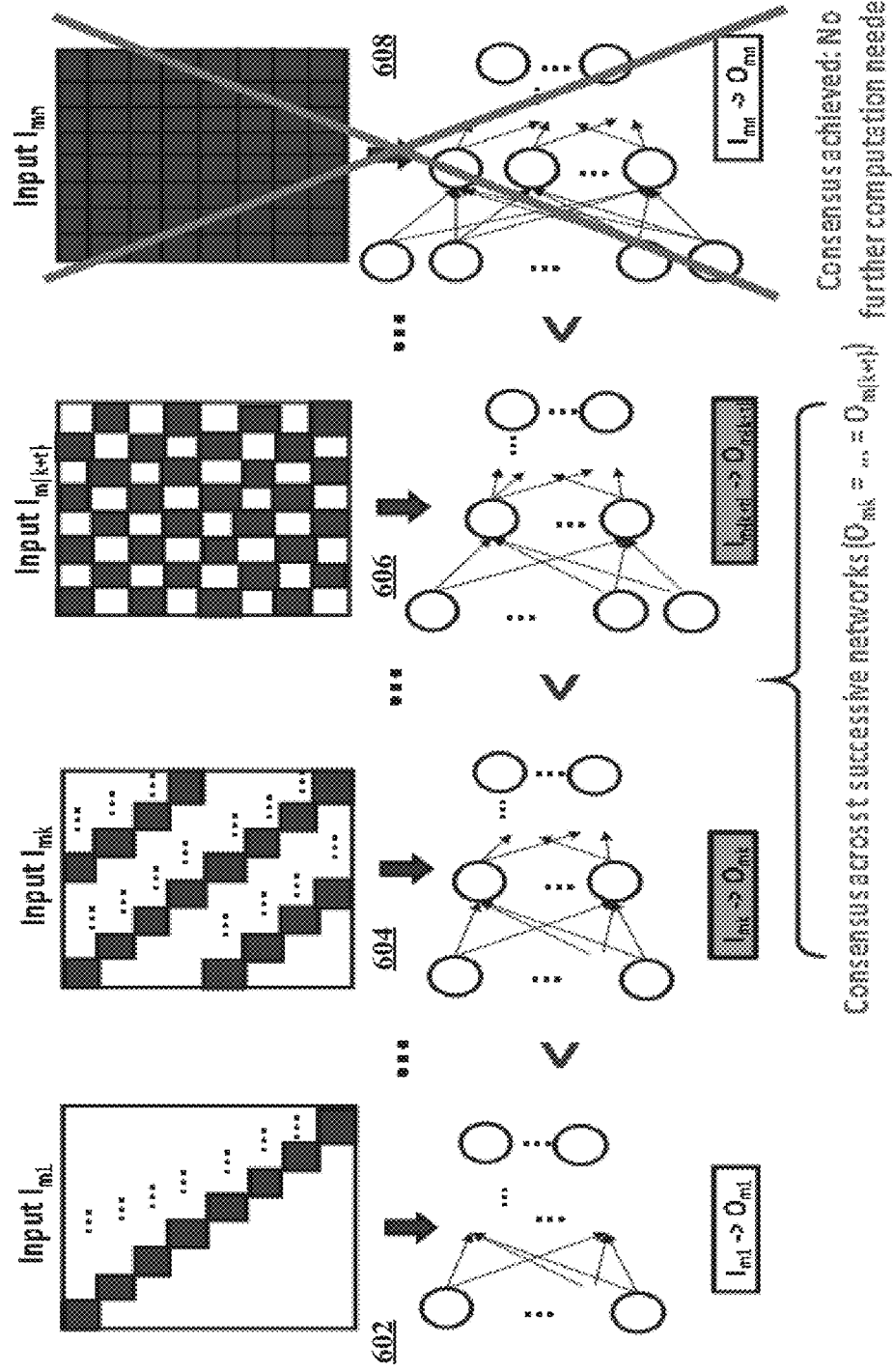
FIG. 6 illustrates a flow diagram as each neural network becomes increasingly complex as it operates on successively more inputs.

FIG. 6 illustrates an embodiment of a process of building a chain of increasingly complex classifiers. Input $I_{m1}$ is identified as a simplest version of a classifier as it contains least amount of data inputs. The inputs become increasingly more complex with the series of Input $I_{ml}$ followed by Input $I_{mk}$ ending with an assumed final product of Input $I_{m(k+t)}$. The largest of a set of neural networks 606 reaching consensus on output represents a neural network being sufficient to produce an acceptable or optimum classification outcome; and any classifier 608 larger than classifier 606 is deemed extraneous for the classification task at hand. A typical neural network will generally utilize all input data to a final degree to complete its computational process. The consensus model disclosed herein provides an alternative path as the process dictates that when an outcome from a neural network reaches consensus with an outcome of a next successive complex network (($O_{mk}= \ldots =O_{m(k+t)}$ (within a predefined parameter)), no further calculations are required as consensus is achieved. The consensus represents that a satisfactory classification level has been achieved by the set of neural networks reaching output consensus. Thus, any increased sizing or complexity beyond the largest or most complex of the consensus set or neural networks is unnecessary for the given classification task. In other words, any increased sizing or complexity of the neural networks would be over engineering for the task at hand. As noted the larger or more complex a neural network, typically equates to increased usage of processing resources, communications bandwidth, memory utilization and other resource consumption. The subject innovations facilitate converging on appropriate sizing and complexity of neural networks for particular classification tasks thus facilitating optimization of resource utilization and increased efficiency. The 602-608 input blocks in FIG. 6 depicts respective neural networks becoming increasing complex as input complexity increases. As can be seen, classification consensus has been achieved at 604 and 606, and thus the neural networks associated at these blocks are of sufficient size and/or complexity for the classification at hand. The larger or more complex neural network associated with 608 is over engineered for the classification task at hand. Accordingly, any neural network larger or more complex than that of 606 is unnecessary or over-engineered.

Figure 7:
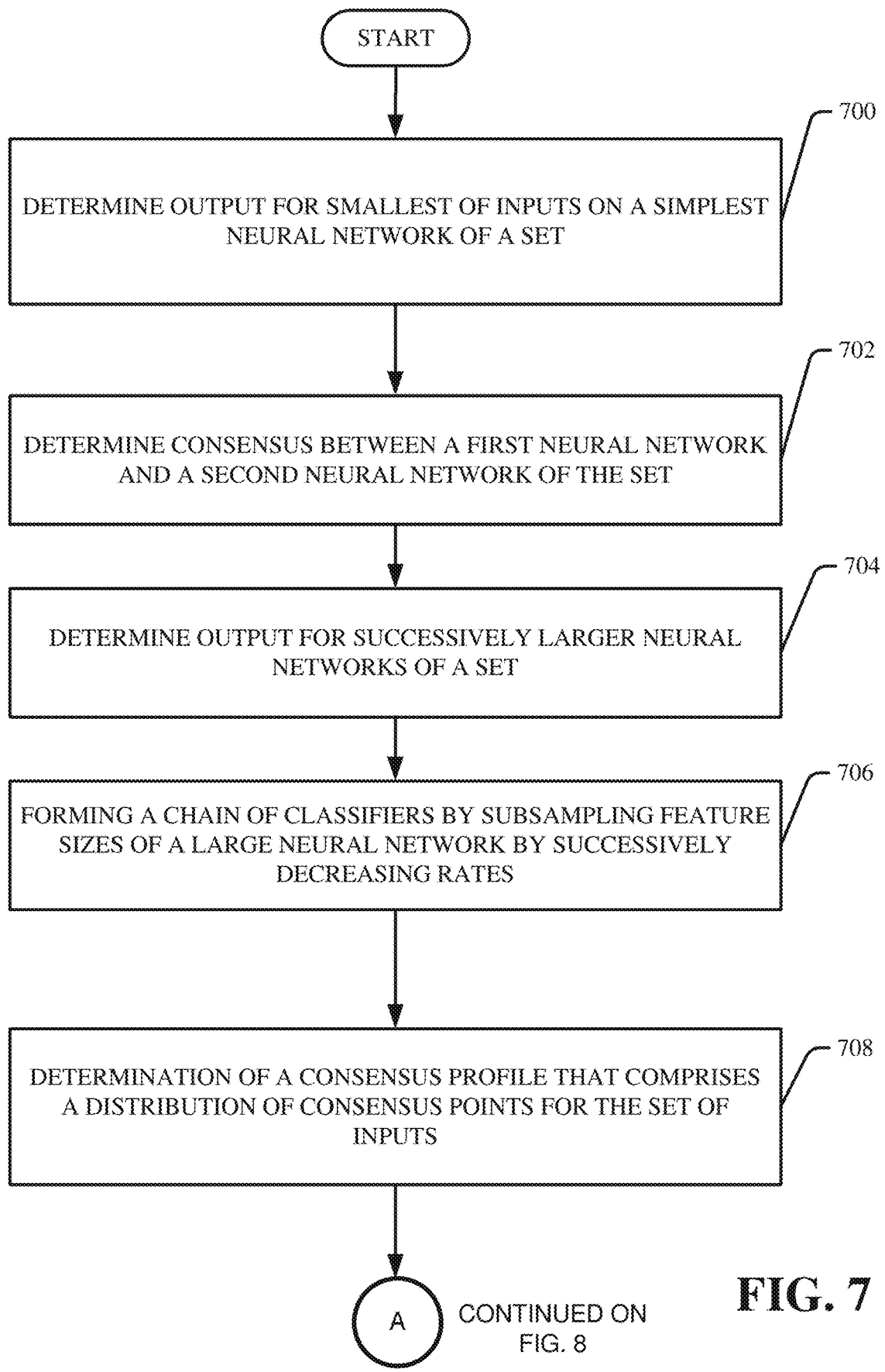
FIG. 7 illustrates an example methodology that exploits spatial correlation in inputs to build neural networks for different sub-sampling rates using consensus based techniques.
Figure 8:
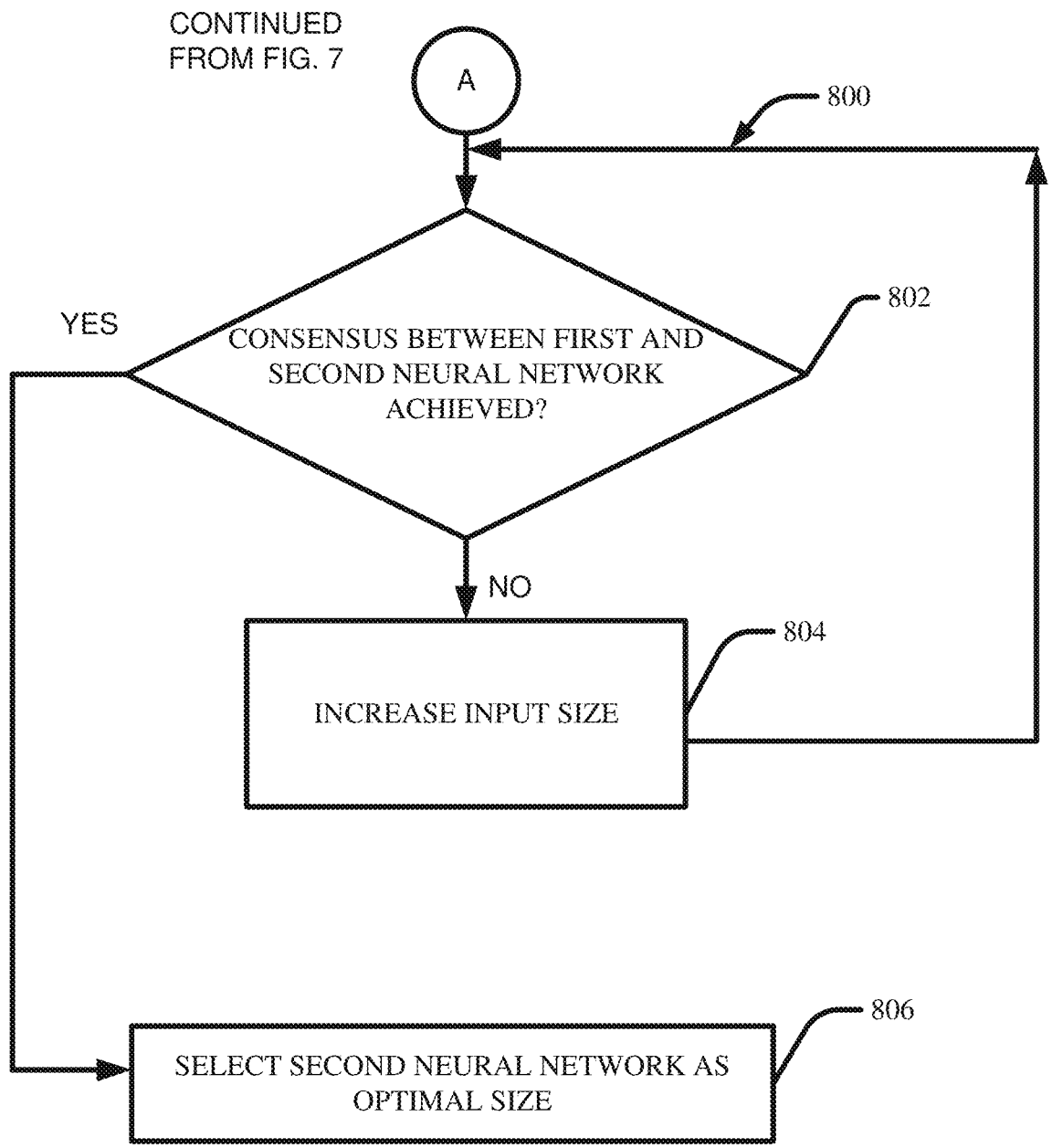
FIG. 8 illustrates an example methodology that exploits spatial correlation in inputs to build neural networks for different sub-sampling rates using consensus based techniques.

FIGS. 7-8 illustrate a flow diagram of an example, non-limiting computer-implemented method 700 that facilitates exploiting spatial correlation in inputs to build neural networks for different sub-sampling rates using consensus based techniques to mitigate over-engineering of neural networks in accordance with one or more embodiments described herein. Repetitive description of like elements employed in other embodiments described herein is omitted for sake of brevity.

At 700, a determination is made (e.g., using determination component 112) as to output for smallest of inputs on a simplest neural network of a set of neural networks. This becomes a starting point for a linear sequence of higher complexity output comparisons. At 702, a determination is made (e.g., using consensus component 110) as to whether there is consensus between a first and second neural network of the set. At 704, a determination is made (e.g., using determination component 112) of output for successively larger neural networks of the set. At 706, a chain of classifiers (e.g., by architecture component 402) is formed by sub-sampling feature sizes of a large neural network and successively decreasing rate. This occurs as each neural network becomes increasingly more complex as it operates on successively more complex inputs. It is to be appreciated that decreasing rates can mean increasing complexity by successively reducing interval between selected feature components (e.g., such as successive input pixels for instance).

At 708, a determination is made of a consensus profile (e.g., using profile component 502) that comprises a distribution of consensus points for the set of inputs—this act refers to a checkpoint where a sequence of two neural network outputs have been identified for comparison. At 802 a determination is made (e.g., using consensus component 110) whether consensus between a first and second neural network has been achieved. If YES, at 806 the second neural network of the consensus set is deemed of optimal size or complexity. If NO, at 804 input size is increased and the process returns to 802. Thus, if the output across "t" consecutive networks has been confirmed as equal, consensus is achieved and no further computation is needed. If this is not the case then additional computational work has to be continued by further increasing the input size and repeating the comparison on an iterative basis. It is to be appreciated that consensus across neural networks of varying size can be achieved by neural networks not adjacent or in direct serial order of neural networks of a set.

Another aspect of a proficient and highly capable neural network is an ability for error checking. For this process, error-checking is based on an aggregate consensus profile. Large multi-layer neural networks are susceptible to errors during training and inference stages. These errors can be of different types, random bit flips, timing errors due to operation at insufficient voltage level etc. Detecting/correcting these errors is highly expensive from a performance/power perspective since this would require redundant computation of the original inference operation (DMR (direct model reference) for detection, TMR (triple modular redundancy) for correction). In practice, most applications typically expect overall accuracy rate to be maintained in spite of errors without requiring focus on every inference that is rendered incorrect due to error.

It is possible to create an 'aggregated' consensus across a batch of inference outputs. Sample embodiments of the aggregated consensus metric could include a fit (polynomial/gaussian etc.) of the consensus points for each inference output to a specified distribution and or a histogram showing the fractions of inputs achieving consensus at different network sizes. Consensus-based correctness checking enables an 'aggregated' accuracy to be maintained using smaller neural networks that result in substantially lower resource utilization as compared to the current state of the art. Error checking based on aggregate consensus profiles also enables predicting and mitigating catastrophic failures from occurring in neural networks at low voltages, by determining minimum permissible operating voltage. This preventative safety feature can be instrumental throughout the process of arriving at neural network consensus.

Figure 9:
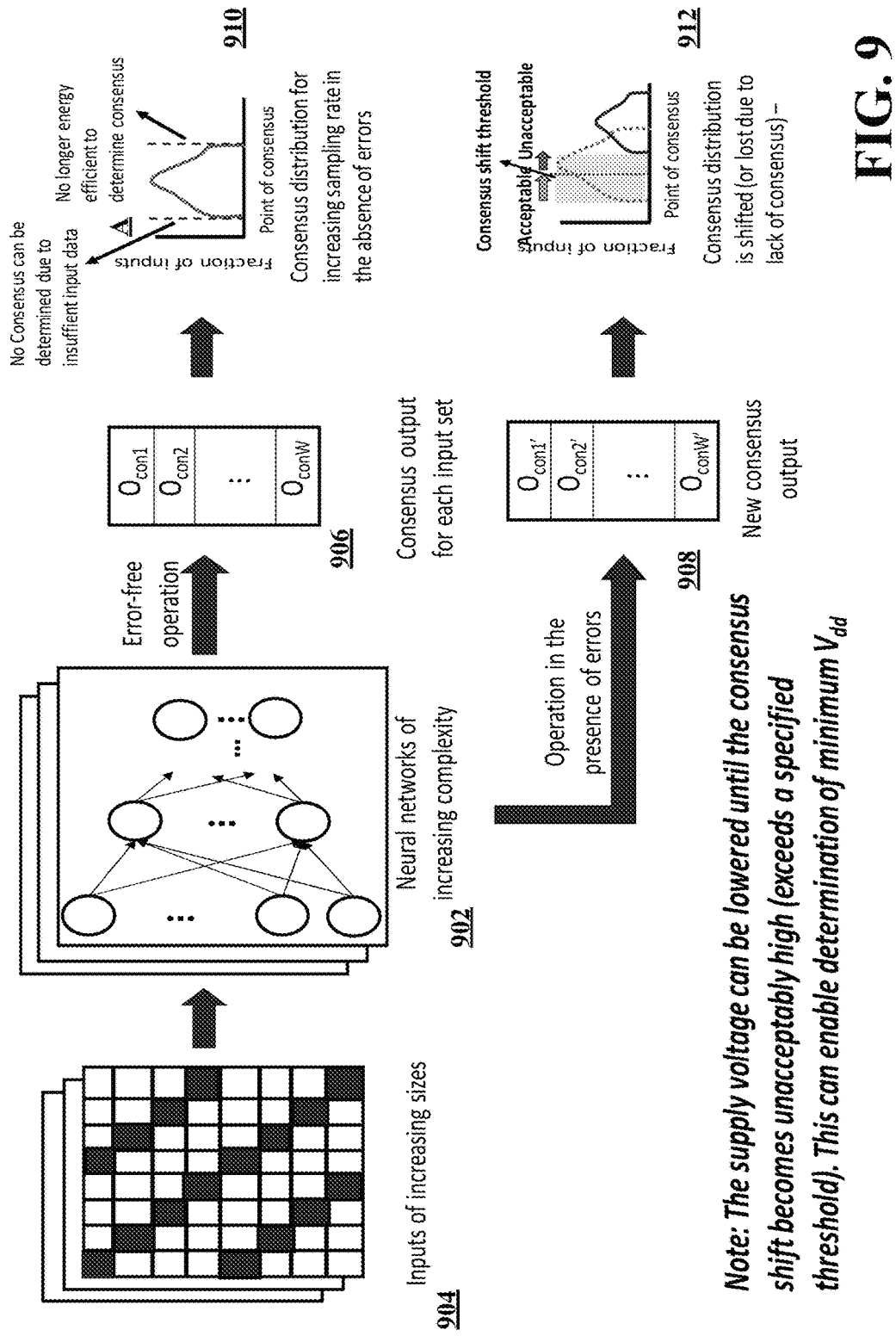
FIG. 9 illustrates an example process of error checking based on consensus profile and the iterative process of error threshold comparison.
Figure 10:
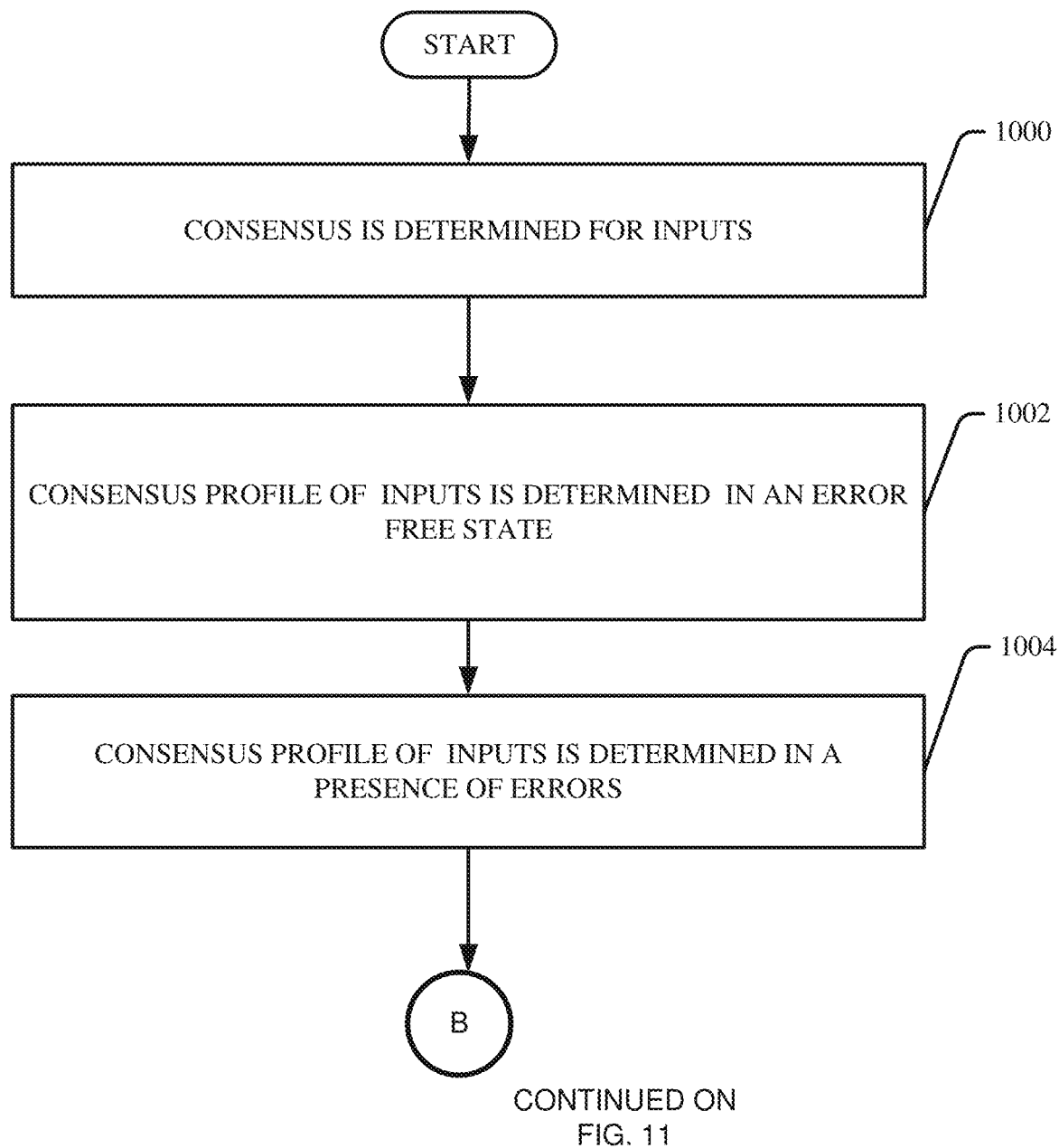
FIG. 10 illustrates an example process sequence that can be utilized to reach a point where determination can be adequately performed to calculate the error is within a pre-determined threshold of a consensus profile in presence of errors.
Figure 11:
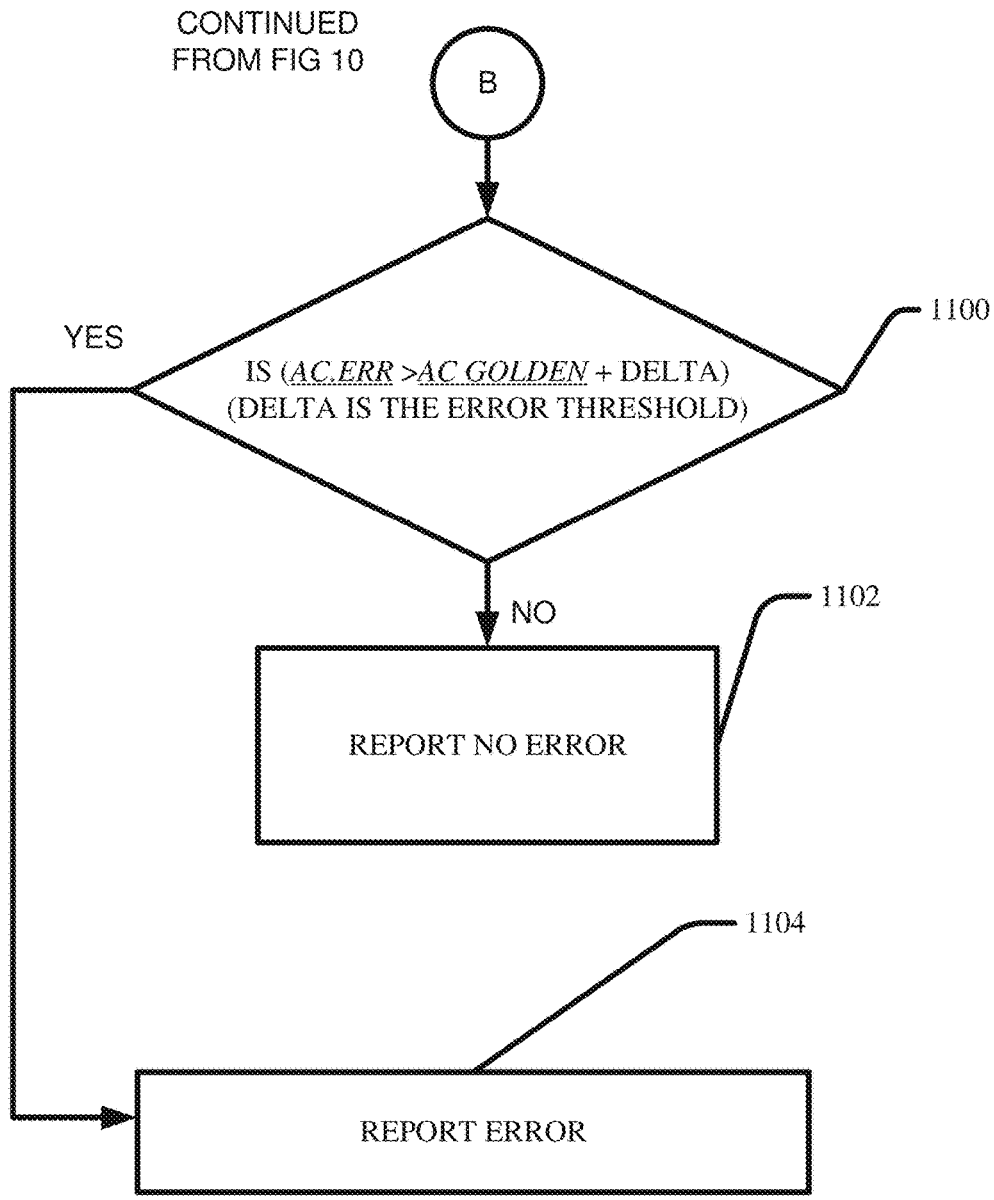
FIG. 11 illustrates an example methodology for determining if an aggregate consensus in presence of errors is greater than an aggregate consensus across all inputs in an error free state.

FIG. 9 illustrate an example, non-limiting computer-implemented process of error checking based on consensus output of respective input sets. A minimum boundary line "A" is depicted where there is insufficient data to determine if a consensus can be declared and a maximum boundary line where it's no longer energy efficient to continue searching for a consensus. The area between these two boundaries is the consensus point. This is the case when the consensus distribution is in the absence of errors. If the consensus distribution is shifted, the consensus point may be present in the unacceptable error zone and therefore be unavailable as the consensus profile. FIG. 10 itemizes each step required in this error checking process. 1000 refers to the determination of the consensus point for each input. 1002 refers to determining the aggregate consensus profile across all inputs in an error free state. 1004 requires a re-computation of the aggregate consensus in the presence of errors. 1100 is the step of determining that a delta of the consensus profile without errors is within a pre-determined threshold of the consensus profile in the presence of errors. FIG. 11 illustrates the final decision block of the aggregate consensus comparison. Is $(AC_{err} > AC_{golden} + \Delta)$ where $\Delta$ is the error threshold. If $(AC_{err}$ is $> AC_{golden} + \Delta)$ then an error is reported and the process stops. If $(AC_{err}$ is $< AC_{golden} + \Delta)$ then no error is reported and the process stops.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
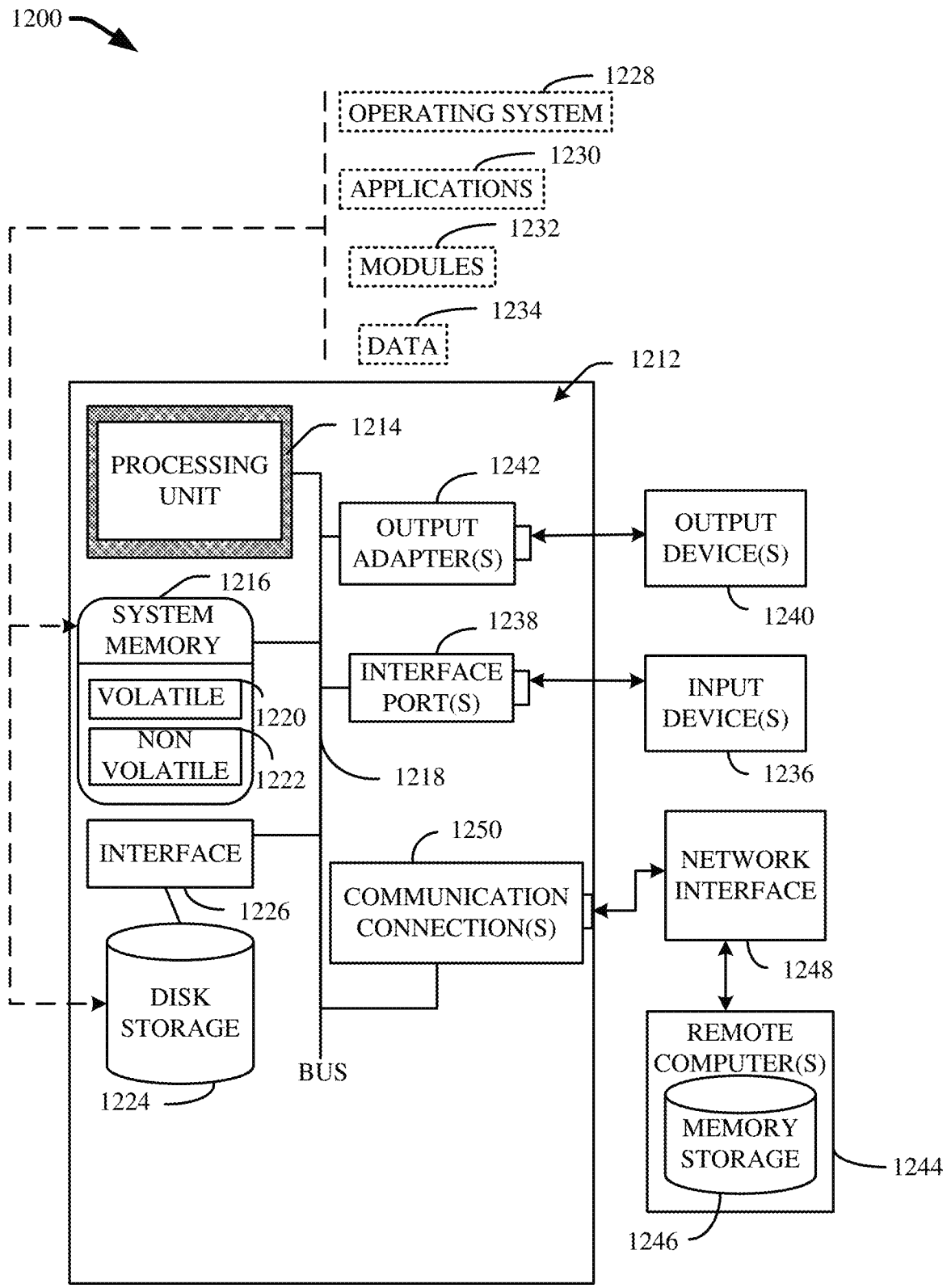
FIG. 12 is a schematic diagram of an example operating environment in accordance with one or more implementations described herein.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/nonvolatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1201. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
a determination component that:
determines a first output for a first neural network of a set of neural networks based on a first input subset of data sub-sampled from an input set of data, and
iteratively, until an optimally complex neural network is determined, performs a process comprising:
determines a second output for a second neural network of the set of neural networks based on a second input subset of data sub-sampled from the input set of data, wherein the second input subset of data is different from and has a larger size than the first input subset of data and previous second input subsets of data from earlier iterations of the process, wherein the second neural network has greater complexity than the first neural network and previous second neural networks from the earlier iterations of the process, and complexity is a function of at least one of input pixel count or hidden layer sizes,
determines whether the second output has consensus, according to a consensus criterion, with at least one of the first output of the first neural network or any previous second outputs from the previous second neural networks from the earlier iterations of the process, comprising:
determine, in an error-free state, a first consensus profile across the first input subset of data, the previous second input subset of data, and the second input subset of data,
determine, in a presence of errors, a second consensus profile across the first input subset of data, the previous second input subset of data, and the second input subset of data,
determine a delta between the first consensus profile and the second consensus profile, and wherein an error is reported if the delta is greater than the threshold or a no-error is reported if the delta is less than the threshold, and
in response to a determination that the second output has consensus, according to the consensus criterion, with at least one of the first output of the first neural network or any previous second outputs from the previous second neural networks from the earlier iterations of the process, determines that the second neural network is the optimally complex neural network.

2. The system of claim 1, further comprising a training component that generates the set of neural networks trained for respective input subsets of data sub-sampled from the input set of data of varying input pixel counts.

3. The system of claim 1, wherein the first neural network is a least complex neural network of the set of neural networks.

4. The system of claim 1, further comprising an architecture component that forms a chain of increasingly complex classifiers by subsampling feature sizes of a most complex neural network of the set of neural networks based on at least one parameter comprising one or more of: successively decreasing sub-sampling rates, wherein decreasing the sub-sampling rates is increasing the complexity by successively reducing interval between selected feature components or bit precision of the input.

5. The system of claim 1, wherein a consensus profile comprises a distribution of consensus points for the first input subset of data, the previous second input subset of data, and the second input subset of data.

6. The system of claim 1, wherein an input size of the second input subset of data is increased relative to a previous input size of a previous second input subset of data at each iteration of the process.

7. The system of claim 1, wherein a minimum permissible operating voltage is determined as a function of the delta exceeding the threshold.

8. A computer-implemented method, comprising employing a processor and memory to execute computer executable components to perform the following acts:
determining a first output for a first neural network of a set of neural networks based on a first input subset of data sub-sampled from an input set of data; and
iteratively, until an optimally complex neural network is determined, performing a process comprising:
determining a second output for a second neural network of the set of neural networks based on a second input subset of data sub-sampled from the input set of data, wherein the second input subset of data is different from and has a larger size than the first input subset of data and previous second input subsets of data from earlier iterations of the process, wherein the second neural network has greater complexity than the first neural network and previous second neural networks from the earlier iterations of the process, and complexity is a function of at least one of input pixel count or hidden layer sizes,
determining whether the second output has consensus, according to a consensus criterion, with at least one of the first output of the first neural network or any previous second outputs from the previous second neural networks from the earlier iterations of the process, comprising:
determining, in an error-free state, a first consensus profile across the first input subset of data, the previous second input subset of data, and the second input subset of data,
determining, in a presence of errors, a second consensus profile across the first input subset of data, the previous second input subset of data, and the second input subset of data,
determining a delta between the first consensus profile and the second consensus profile, and
wherein an error is reported if the delta is greater than the threshold or a no-error is reported if the delta is less than the threshold, and
in response to a determination that the second output has consensus, according to the consensus criterion, with at least one of the first output of the first neural network or any previous second outputs from the previous second neural networks from the earlier iterations of the process, determining that the second neural network is the optimally complex neural network.

9. The method of claim 8, further comprising generating the set of neural networks trained for respective input subsets of data sub-sampled from the input set of data of varying sizes.

10. The method of claim 8, wherein the first neural network is a least complex neural network of the set of neural networks.

11. The method of claim 8, further comprising forming a chain of increasingly complex classifiers by subsampling feature sizes of a most complex neural network of the set of neural networks based on at least one parameter comprising one or more of: successively decreasing sub-sampling rates, wherein decreasing the sub-sampling rates is increasing the complexity by successively reducing interval between selected feature components or bit precision of the input.

12. The method of claim 8, wherein a consensus profile comprises a distribution of consensus points for the first input subset of data, the previous second input subset of data, and the second input subset of data.

13. The method of claim 8, wherein an input size of the second input subset of data is increased relative to a previous input size of a previous second input subset of data at each iteration of the process.

14. A computer program product comprising a computer readable storage medium having program instructions embodied therewith, the program instructions executable by processor to cause the processor to:
generate a set of neural networks trained for respective input data of varying sizes;
determine a first output for a first neural network of the set of neural networks based on a first input subset of data sub-sampled from an input set of data;
iteratively, until an optimally complex neural network is determined, perform a process comprising:
determine a second output for a second neural network of the set of neural networks based on a second input subset of data sub-sampled from the input set of data, wherein the second input subset of data is different from and has a larger size than the first input subset of data and previous second input subsets of data from earlier iterations of the process, wherein the second neural network has greater complexity than the first neural network and previous second neural networks from the earlier iterations of the process, and complexity is a function of at least one of input pixel count or hidden layer sizes, determines whether the second output has consensus, according to a consensus criterion, with at least one of the first output of the first neural network or any previous second outputs from the previous second neural networks from the earlier iterations of the process, comprising:

determine, in an error-free state, a first consensus profile across the first input subset of data, the previous second input subset of data, and the second input subset of data, determine, in a presence of errors, a second consensus profile across the first input subset of data, the previous second input subset of data, and the second input subset of data, determine a delta between the first consensus profile and the second consensus profile, and wherein an error is reported if the delta is greater than the threshold or a no-error is reported if the delta is less than the threshold, and in response to a determination that the second output has consensus, according to the consensus criterion, with at least one of the first output of the first neural network or any previous second outputs from the previous second neural networks from the earlier iterations of the process, determine that the second neural network is the optimally complex neural network.

15. The computer program product of claim 14, wherein an input size of the second input subset of data is increased relative to a previous input size of a previous second input subset of data at each iteration of the process.

16. The computer program product of claim 14, wherein the consensus criterion comprises an error threshold.

* * * * *